(12) United States Patent
Kagawa et al.

(10) Patent No.: US 11,146,738 B2
(45) Date of Patent: Oct. 12, 2021

(54) IMAGE PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Hidetsugu Kagawa, Kawasaki (JP); Shuhei Ogawa, Kawasaki (JP); Tetsuya Suwa, Yokohama (JP); Maya Yazawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 2 days.

(21) Appl. No.: 16/446,838

(22) Filed: Jun. 20, 2019

(65) Prior Publication Data

US 2020/0007734 A1 Jan. 2, 2020

(30) Foreign Application Priority Data

Jun. 29, 2018 (JP) .............................. JP2018-125282

(51) Int. Cl.
*G06K 9/40* (2006.01)
*H04N 5/235* (2006.01)
*G06T 7/11* (2017.01)
*G06T 7/174* (2017.01)
*G06T 5/50* (2006.01)
*G06T 5/00* (2006.01)

(52) U.S. Cl.
CPC .......... *H04N 5/2355* (2013.01); *G06T 5/009* (2013.01); *G06T 5/50* (2013.01); *G06T 7/11* (2017.01); *G06T 7/174* (2017.01); *G06T 2207/20021* (2013.01); *G06T 2207/20208* (2013.01)

(58) Field of Classification Search
CPC ......... H04N 5/2355; G06T 7/11; G06T 7/174; G06T 5/009; G06T 5/50; G06T 2207/20021; G06T 2207/20208
USPC ..................................................... 382/274
See application file for complete search history.

(56) References Cited

U.S. PATENT DOCUMENTS 5,818,975 A * 10/1998 Goodwin ............. H04N 1/4072
                                                         382/274
6,608,926 B1   8/2003 Suwa et al.
6,694,051 B1   2/2004 Yamazoe et al.
(Continued)

FOREIGN PATENT DOCUMENTS

JP    2006-129105 A    5/2006
JP    2015-156615 A    8/2015

*Primary Examiner* — Stephen P Coleman
(74) *Attorney, Agent, or Firm* — Venable LLP

(57) ABSTRACT

An image processing apparatus divides a first image into a plurality of areas based on obtained image data of the first image and sets relationship information between input brightness values with output brightness values for each of the plurality of areas, and converts, based on the relationship information, a brightness value of pixels included in the first image into a brightness value of pixels of a second image whose brightness range is narrower than that of the first image. In the conversion, the apparatus sets, for at least some pixels of the first image, a size of a window for specifying pixels within a predetermined area including the pixels based on environment information in which the second image is observed, and calculates a brightness value in the second image for each of the at least some pixels based on the window.

25 Claims, 18 Drawing Sheets

(56) References Cited

U.S. PATENT DOCUMENTS

| | | |
|---|---|---|
| 7,432,985 B2 | 10/2008 | Ishikawa et al. |
| 7,924,469 B2 | 4/2011 | Ono et al. |
| 7,944,588 B2 | 5/2011 | Yamada et al. |
| 8,175,155 B2 | 5/2012 | Suwa et al. |
| 8,237,991 B2 | 8/2012 | Ono et al. |
| 9,088,753 B2 | 7/2015 | Akiba et al. |
| 9,135,523 B2 | 9/2015 | Kato et al. |
| 9,189,681 B2 | 11/2015 | Kunieda et al. |
| 9,232,109 B2 | 1/2016 | Suwa et al. |
| 9,275,270 B2 | 3/2016 | Suwa et al. |
| 9,386,186 B2 | 7/2016 | Mochizuki et al. |
| 9,652,687 B2 | 5/2017 | Sato |
| 9,769,352 B2 | 9/2017 | Yanai et al. |
| 2012/0033086 A1* | 2/2012 | Hsieh .................. H04N 17/002 348/184 |
| 2012/0268759 A1 | 10/2012 | Ono et al. |
| 2015/0245000 A1 | 8/2015 | Sato |
| 2017/0302858 A1* | 10/2017 | Porter ................ H04N 5/23229 |
| 2017/0309011 A1 | 10/2017 | Hori et al. |
| 2017/0316558 A1 | 11/2017 | Hori et al. |

\* cited by examiner

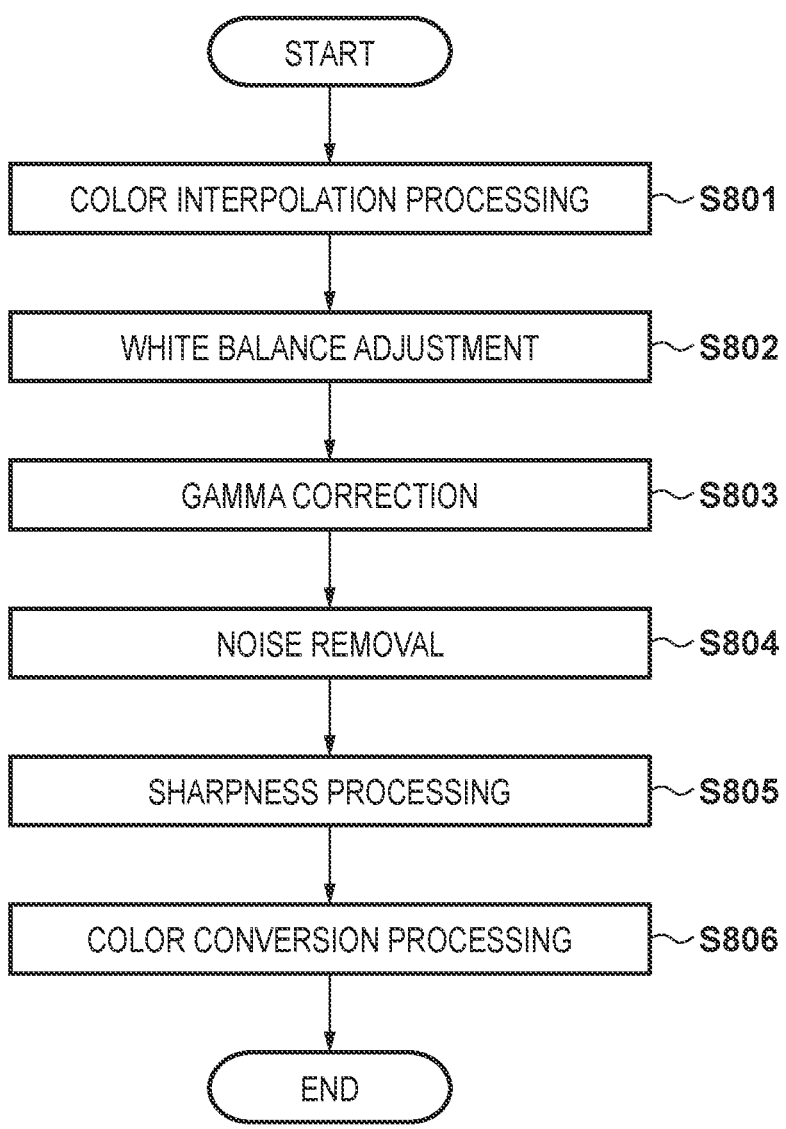

FIG. 9A

| R (%) | | NORMAL MODE | HIGH BRIGHTNESS OBTAINING MODE |
|---|---|---|---|
| CAMERA MODEL | A | 220 | 440 |
| | B | 250 | 500 |
| | C | 260 | 520 |

FIG. 9B

| BRIGHTNESS VALUE (cd/m$^2$) | | BLACK | WHITE |
|---|---|---|---|
| PAPER TYPE | I | 5 | 90 |
| | II | 10 | 88 |
| | III | 15 | 82 |

FIG. 17A

| Input | Output | | | |
|---|---|---|---|---|
| | AREA 1702 | AREA 1703 | AREA 1704 | AREA 1705 |
| 0 | 0 | 0 | 0 | 0 |
| 1 | 1 | 2 | 3 | 5 |
| 2 | 2 | 4 | 9 | 15 |
| 3 | 3 | 6 | 18 | 25 |
| ⋮ | ⋮ | ⋮ | ⋮ | ⋮ |
| 1023 | 1023 | 1023 | 1023 | 1023 |

FIG. 17B

| Input | Output |
|---|---|
| | AREA P |
| 0 | 0 |
| 1 | 3 |
| 2 | 9 |
| 3 | 15 |
| ⋮ | ⋮ |
| 1023 | 1023 |

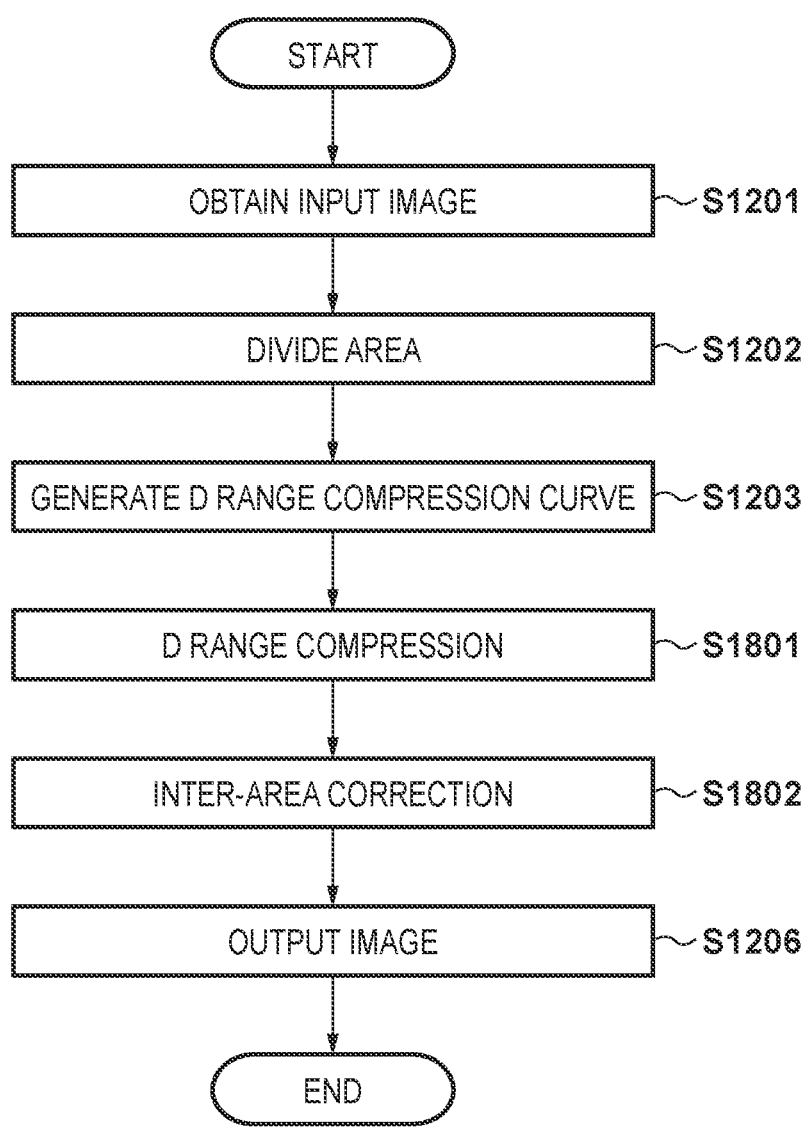

FIG. 20A

| -1 | -1 | -1 |
|----|----|----|
| -1 | 8  | -1 |
| -1 | -1 | -1 |

FIG. 20B

| -1 | -1 | -1 | -1 | -1 |
|----|----|----|----|----|
| -1 | -1 | -1 | -1 | -1 |
| -1 | -1 | 24 | -1 | -1 |
| -1 | -1 | -1 | -1 | -1 |
| -1 | -1 | -1 | -1 | -1 |

IMAGE PROCESSING APPARATUS, CONTROL METHOD, AND NON-TRANSITORY COMPUTER-READABLE STORAGE MEDIUM

BACKGROUND OF THE INVENTION

Field of the Invention

The present invention relates to a dynamic range compression technique for the brightness of an image.

Description of the Related Art

In recent years, HDR (High Dynamic Range) content having a reproduction range of a high brightness and wide color gamut has become popular. In HDR content, high-quality image expression using a wide brightness range by a highest brightness of 1,000 nit or more is performed. On the other hand, when printing HDR image data by an inkjet printing apparatus, the dynamic range (to be referred to as a "D range" hereinafter) of the brightness needs to be compressed using a tone curve or the like into the D range of a brightness that the printing apparatus can reproduce. To reduce lowering of contrast in the D range compression, a method of locally performing D range compression is used. Japanese Patent Laid-Open No. 2006-129105 describes a technique of dividing an input image into a plurality of areas, deciding a lookup table for each of the divided areas, and performing D range compression.

When an input image is divided into a plurality of areas, and D range compression is then performed, image quality may degrade because a curve (to be referred to as a "D range compression curve" hereinafter) representing the relationship between an input range and an output range in the D range compression and assigned to each area changes.

SUMMARY OF THE INVENTION

The present invention provides a technique of reducing the influence of image quality degradation when compressing the dynamic range of a brightness.

According to one aspect of the present invention, there is provided an image processing apparatus comprising: at least one processor; and at least one memory coupled to the at least one processor, wherein the at least one memory stores an instruction that causes, when executed by the at least one processor, the image processing apparatus to: divide a first image into a plurality of areas based on obtained image data of the first image having first brightness and set, for each of the plurality of areas, relationship information that associates an input brightness value with an output brightness value; and convert, based on the relationship information, a brightness value of a pixel included in the first image into a brightness value of a pixel of a second image of which a brightness range is narrower than that of the first image, wherein the instruction further causes, when executed by the at least one processor, the image processing apparatus to: in the conversion, obtain information of an environment when the second image is observed; set, for at least some pixels of the first image, a size of a window configured to specify pixels within a predetermined area including the pixels, based on the information of the environment; and calculate a brightness value in the second image for each of the at least some pixels based on the relationship information set for an area, at least part of which is within the window.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart showing an example of the procedure of development processing;

FIG. 9A is a view for explaining an input brightness range;

FIG. 9B is a view for explaining an output brightness range;

FIG. 17A is a view showing an example of lookup tables specified for the areas;

FIG. 17B is a view showing an example of a corrected lookup table;

FIG. 18 is a flowchart showing an example of the procedure of dynamic range compression processing;

FIGS. 20A and 20B are views showing examples of frequency detection filters.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(Relationship Between Dynamic Range Compression and Image Quality Degradation)

The relationship between image quality degradation and D range compression performed by dividing an image into a plurality of areas will be described first.

Figure 1:
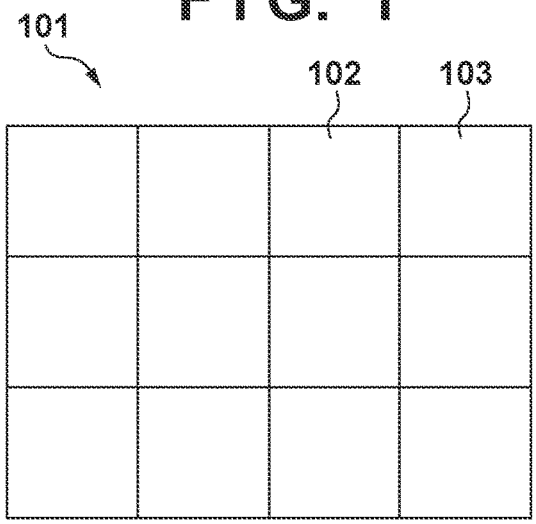
FIG. 1 is a view showing an example of an image divided for compression of a dynamic range.
Figure 2A:
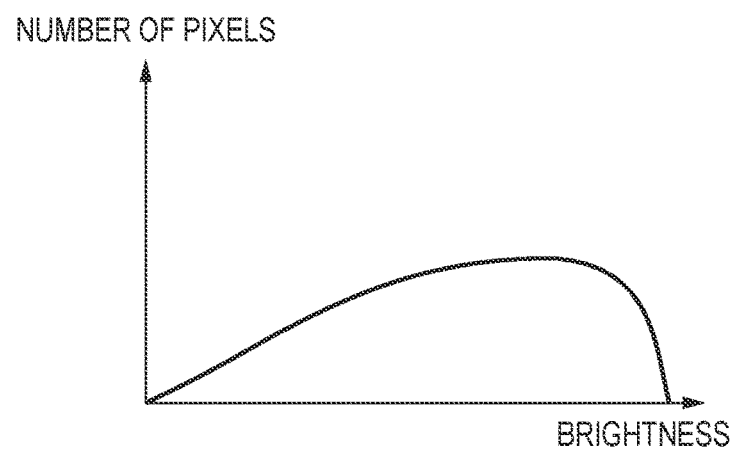
FIGS. 2A and 2B are views showing examples of brightness value distributions for the areas of the image.
Figure 2B:
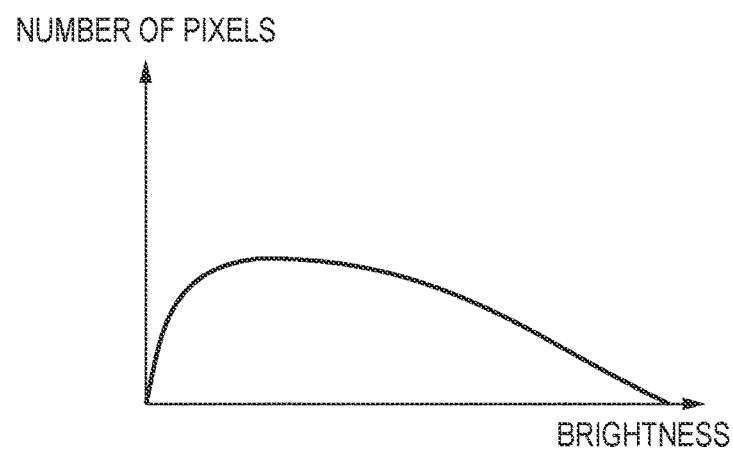
Figure 3A:
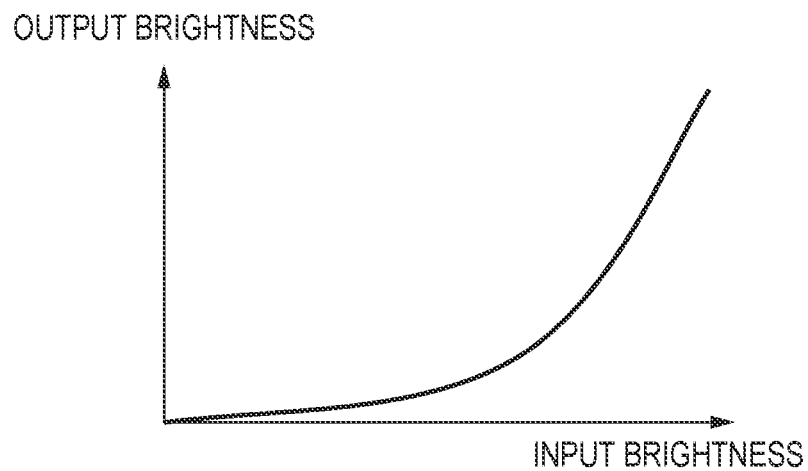
FIGS. 3A and 3B are views showing examples of dynamic range compression curves for the areas.
Figure 3B:
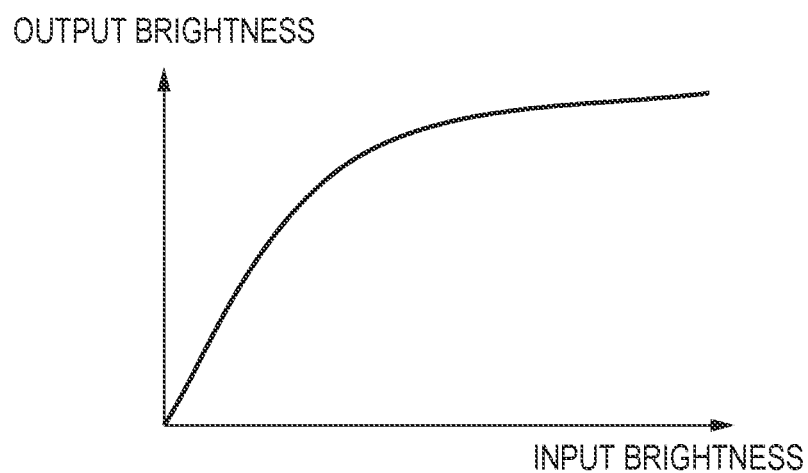

FIG. 1 shows an example in which an image 101 is divided into 4×3 areas, and FIGS. 2A and 2B show examples of histograms representing brightness distributions in areas 102 and 103 shown in FIG. 1, respectively. In one example, for the area 102 including many pixels in a high brightness range, as shown in FIG. 2A, a D range compression curve with focus on contrast in the high brightness range is set. In addition, for the area 103 including many pixels of a histogram in a low brightness range, as shown in FIG. 2B, a D range compression curve with focus on contrast in the low brightness range can be set. FIGS. 3A and 3B show examples of the D range compression curves applied to the areas 102 and 103, respectively. Referring to FIGS. 3A and 3B, the abscissa represents an input brightness range, and the ordinate represents an output brightness range. The ordinate and the abscissa in FIGS. 3A and 3B are normalized. A coefficient corresponding to an actual D range is multiplied, thereby deciding a value used in actual processing. In one example, the input brightness range can have a range of 1 [nit] to 1,000 [nit], and the output brightness range can have a range of 5 [nit] to 90 [nit]. In this way, D range compression curves that are largely different, as shown in FIGS. 3A and 3B, can be applied to the adjacent areas in the image. At the boundary between the areas where the applied D range compression curve largely changes, image quality degradation such as gray scale inversion or pseudo-contour may be caused by the difference between the curves. In HDR image data, the D range is wider than that of conventional SDR image data. The difference in the histogram and the difference in the D range compression curve according to that also readily occur, and the image quality readily degrades.

The manner the image quality degradation is viewed influences an observation condition. As a model of a contrast sensitivity viewed by a human, a Barten model is known. In the Barten model, a contrast sensitivity S viewed by a human is expressed, as a function of a spatial frequency u and a target brightness L of an observation target, by $$S(u, L) = \frac{1}{k}\sqrt{\frac{T}{2}} \frac{M_{opt}(u)}{\sqrt{\left(\frac{1}{\eta h I_L} + \frac{\Phi_0}{(1-F(u))^2} + \Phi_{ext}(u)\right)\cdot\left(\frac{1}{X_0^2} + \frac{1}{X_E^2} + \left(\frac{u}{N_E}\right)^2\right)}} \quad (1)$$

where $M_{opt}(u)$ is the optical system transfer function, k is the signal-to-noise ratio, T is the integration time, η is the quantum efficiency of an eye, h is the photon conversion coefficient of the light source, and IL is the retinal illuminance. In addition, $\Phi_{ext}(u)$ is the contrast variation corresponding to external noise, $\Phi_0$ is the contrast variation corresponding to neural noise. In addition, $X_0$ is the orientation angle of an object, $X_E$ is the maximum angle of an integration area, and $N_E$ is the number of fringes that an eye can recognize. Here, $M_{opt}(u)$ and $F(u)$ are derived from the following relationships.

$$M_{opt}(u) = e^{-\pi^2 \sigma^2 u^2} \quad (2)$$

$$\sigma = \sqrt{\sigma_0^2 + (C_{sph}\cdot d^3)^2} \quad (3)$$

$$d = 4.6 - 2.8\cdot\tanh(0.4\cdot\log_{10}(0.625\cdot L)) \quad (4)$$

$$I_L = \pi/4d^2 L \quad (5)$$

$$(1-F(u))^2 = 1 - \exp\left(-\frac{u^2}{u_0^2}\right) \quad (6)$$

Here, k=3.3, T=0.1, η=0.025, h=357×3600, $\Phi_{ext}(u)$=0, $\Phi_0$=3×10⁻⁸ [sec deg²]. In addition, $X_E$=12 [deg], $N_E$=15 [cycle] (for a frequency of 0 and 90 [deg] and 2 [cycle/deg] or more, $N_E$=7.5 [cycles] at 45 [deg]). In addition, $\sigma_0$=0.0133 [deg], and $C_{sph}$=0.0001 [deg/mm³].

Figure 4:
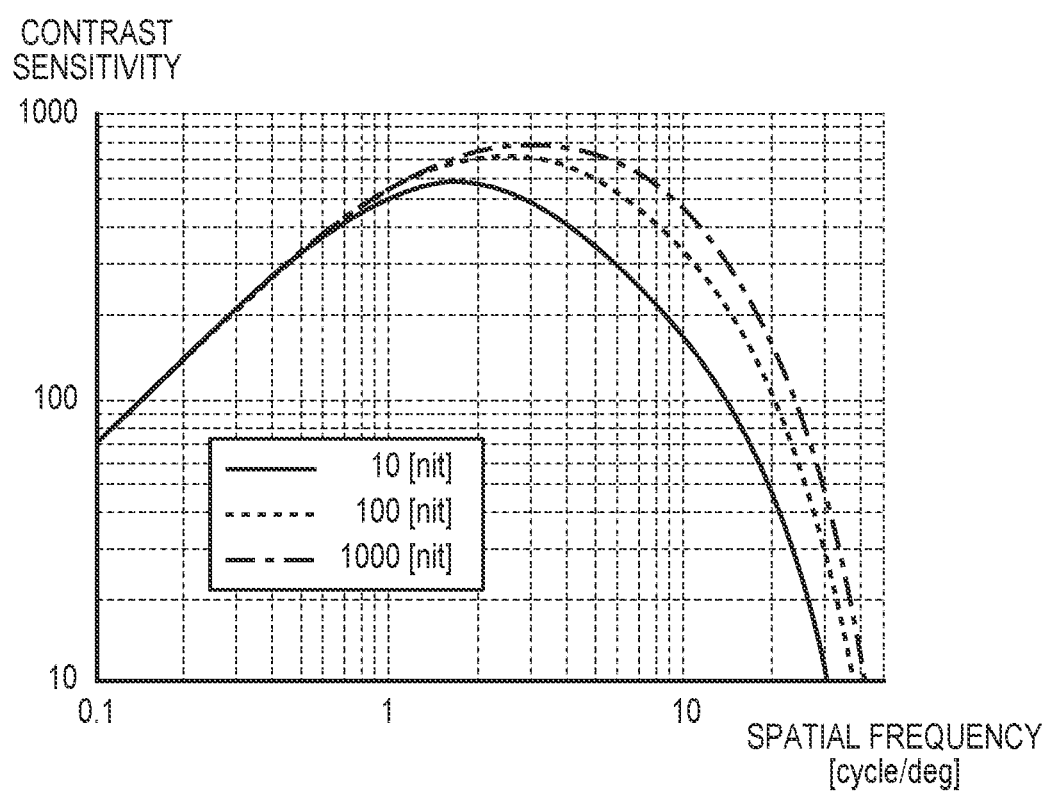
FIG. 4 is a view showing an example of the relationship between a spatial frequency and a contrast sensitivity.

FIG. 4 shows the relationship of the contrast sensitivity of the Barten model to the spatial frequency u in a case in which the target brightness L is set to 10 [nit], 100 [nit], and 1,000 [nit] at this time. As shown in FIG. 4, as the target brightness L becomes high, the frequency of the high contrast sensitivity transitions to a high frequency side. To the contrary, as the target brightness L becomes low, the frequency of the high contrast sensitivity transitions to a low frequency side, as is apparent.

As described above, when observing an output object output from a printer, image quality degradation caused by the view of the contrast is influenced by the brightness or spatial frequency at the time of observation.

In this embodiment, a correction technique of reducing the influence of image quality degradation that can be caused when an area is divided, and the brightness of each area is compressed using a different compression characteristic (curve) in a case in which the range of the brightness is narrower in an output image than in an input image is provided. In particular, in this embodiment, correction for a specific pixel is calculated using information concerning pixels within a predetermined area including the specific pixel. At this time, the above-described predetermined area is adaptively set based on a viewing characteristic concerning the view of the contrast by a human eye, which is determined by an observation condition when observing an output object. This can reduce the influence of image quality degradation in consideration of the visual characteristic.

Examples of a system that executes the above-described processing and the arrangements and processing procedures of apparatuses in the system will be described below.

(System Arrangement)

Figure 5:
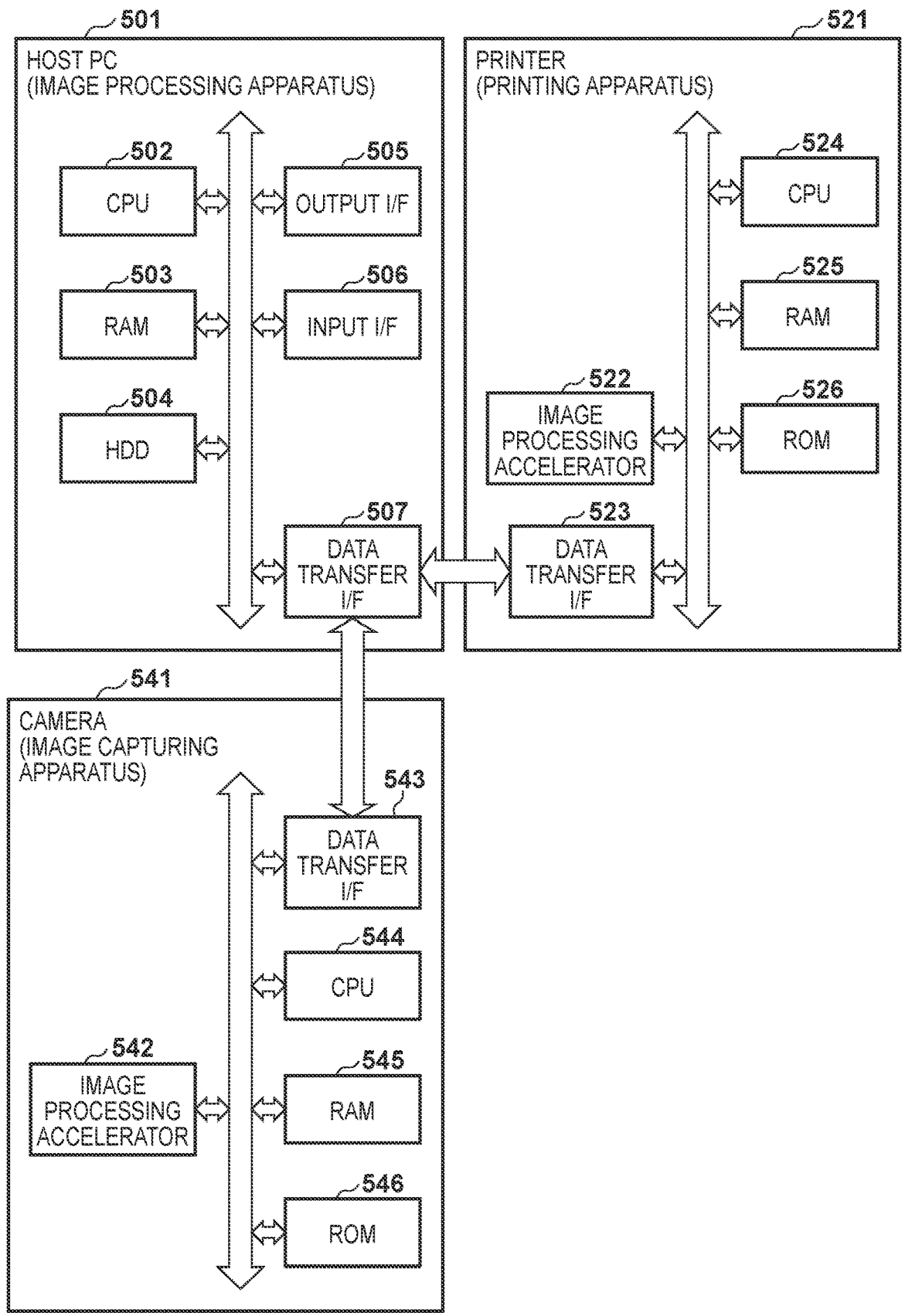
FIG. 5 is a block diagram showing an example of the arrangement of an image processing system.

FIG. 5 shows an example of the arrangement of an image processing system according to this embodiment. This system includes, for example, an image processing apparatus 501, a printing apparatus 521, and an image capturing apparatus 541. Note that this arrangement is merely an example. For example, some apparatuses such as the image capturing apparatus 541 may not be included, or an apparatus other than these may be included. Additionally, a plurality of apparatuses shown in FIG. 5 may be integrated into one apparatus by, for example, incorporating the image processing apparatus 501 in the printing apparatus 521 or the image capturing apparatus 541. Furthermore, a block included in each apparatus shown in FIG. 5 may include another block. Alternatively, each block of each apparatus may be divided into a plurality of blocks, or one block including a plurality of blocks may be used.

The image processing apparatus 501 is, for example, a host PC (Personal Computer), but may be an electronic device other than this. The image processing apparatus 501 includes a CPU 502, a RAM 503, an HDD 504, an output I/F 505, an input I/F 506, a data transfer I/F 507, and the like.

Note that "I/F" is short for "interface". In addition, CPU is an acronym for Central Processing Unit, RAM is an acronym for Random Access Memory, and HDD is an acronym for Hard Disk Drive.

The CPU 502 executes various kinds of processing including the overall processing of the image processing apparatus 501 and predetermined image processing using the RAM 503 as a work area in accordance with a program held by the HDD 504. The CPU 502 is an example of a processor, and a processor other than this may be used. For example, another processor such as an MPU (Micro Processing Unit), a GPU (Graphics Processing Unit), or a DSP (Digital Signal Processor) may additionally or alternatively be used. In addition, processing executed by the CPU 502 may partially or wholly be executed by hardware capable of executing the processing such as an ASIC (Application Specific Integrated Circuit) or an FPGA (Field Programmable Gate Array). The RAM 503 is a memory used to storage temporary information. The RAM 503 at least operates to provide the work area when the CPU 502 executes processing, as described above. The HDD 504 is a storage device configured to continuously store information such as a program. Note that a ROM (Read Only Memory) or the like may be used in place of or in addition to the HDD 504. The output I/F 505 is an interface configured to output data held by the image processing apparatus 501 (for example, after predetermined processing is executed) to an information output apparatus such as a display or speaker on the outside (or an information output apparatus (not shown) provided in the image processing apparatus 501). The input I/F 506 is an interface configured to accept information input from a device such as a keyboard, a pointing device, or a touch panel on the outside (or a device (not shown) provided in the image processing apparatus 501), which accepts a user operation and output information representing the user operation. The data transfer I/F 507 is an interface configured to perform communication with another device, and is, for example, a communication interface including a communication circuit of a wired LAN or wireless LAN. Note that the data transfer I/F 507 may operate in accordance with the USB (Universal Serial Bus) standard or the IEEE (Institute of Electrical and Electronics Engineers) 1394 standard.

For example, the CPU 502 executes processing of generating image data printable by the printing apparatus 521 in accordance with a command input by the user via the input I/F 506 or a program held by the HDD 504. The CPU 502 executes control to transfer the generated image data to the printing apparatus 521 via the data transfer I/F 507. In addition, the CPU 502 can receive image data from an external apparatus such as the printing apparatus 521 or the image capturing apparatus 541 via the data transfer I/F 507, and perform predetermined processing for the image data in accordance with a program stored in the HDD. The CPU 502 executes control to display an image or various kinds of information obtained as the result of the predetermined processing on a display (not shown) via, for example, the output I/F 505.

The printing apparatus 521 is, for example, a printer such as an inkjet printer, but may be a printer of another type such as an electrophotographic printer. In place of the printing apparatus 521, another apparatus configured to output an image after compression of the dynamic range of a brightness to, for example, a screen may be used. The printing apparatus 521 includes, for example, an image processing accelerator 522, a data transfer I/F 523, a CPU 524, a RAM 525, and a ROM 526. In the printing apparatus 521, the CPU 524 executes control of the entire printing apparatus 521 or processing of executing various kinds of other processing in accordance with a program stored in the ROM 526 using the RAM 525 as a work space. Note that the printing apparatus 521 is configured to perform high-speed image processing using the image processing accelerator 522. Note that the image processing accelerator 522 is hardware capable of executing image processing at a speed higher than in the CPU 524. The image processing accelerator 522 is activated when, for example, the CPU 524 writes parameters and data necessary for image processing at a predetermined address of the RAM 525. After the loading of the parameters and the data, the image processing accelerator 522 executes predetermined image processing for the data. Note that the image processing accelerator 522 is configured to alternatively execute processing executable by the CPU 524. In other words, if the CPU 524 has a sufficient processing capability, the printing apparatus 521 may not include the image processing accelerator 522.

The image capturing apparatus 541 can be, for example, a digital still camera or a digital video camera, but may be replaced with a server accumulating images, or the like in one example. The image capturing apparatus 541 includes, for example, an image processing accelerator 542, a data transfer I/F 543, a CPU 544, a RAM 545, and a ROM 546. The CPU 544 executes various kinds of processing such as control of the entire image capturing apparatus 541 using the RAM 545 as a work area in accordance with a program held by the ROM 546. The image processing accelerator 542 is hardware capable of executing image processing at a speed higher than in the CPU 544. The image processing accelerator 542 is activated when the CPU 544 writes parameters and data necessary for image processing at a predetermined address of the RAM 545. After the loading of the parameters and the data, the image processing accelerator 542 executes predetermined image processing for the data. Note that the image processing accelerator 542 is configured to alternatively execute processing executable by the CPU 544. In other words, if the CPU 544 has a sufficient processing capability, the image capturing apparatus 541 may not include the image processing accelerator 542.

(Outline of Processing)

Figure 6:
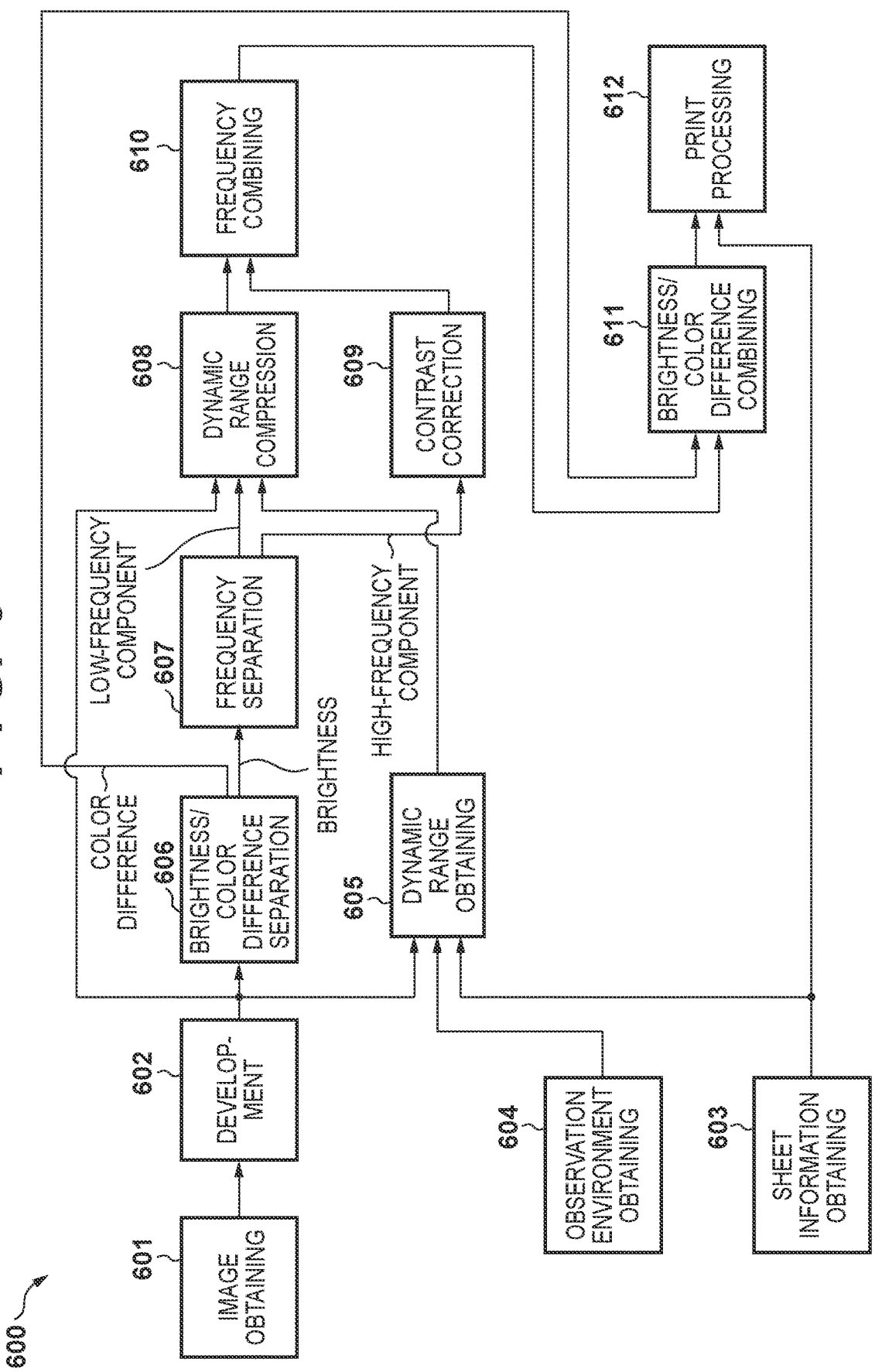
FIG. 6 is a block diagram showing the outline of processing until an image is printed.

An example of the procedure of processing 600 until data captured by the image capturing apparatus 541 is printed by the printing apparatus 521 will schematically be described next with reference to FIG. 6. FIG. 6 shows each of a plurality of partial processes included in the processing 600 as a functional block. Note that each functional block may be divided into two or more functional blocks, or a plurality of functional blocks may be integrated into one functional block. In addition, a functional block that is not illustrated in FIG. 6 may further be included. The processing 600 is processing mainly executed by the image processing apparatus 501 and is implemented when, for example, the CPU 502 executes a program saved in the HDD 504 in cooperation with the RAM 503. Note that the processing 600 may be implemented by one application, or may be implemented by a plurality of applications in accordance with the application purpose of the user or the function. Additionally, the image processing apparatus 501 may execute the whole of the processing 600, or at least part of the processing 600 may be executed by at least one of the printing apparatus 521 and the image capturing apparatus 541.

In this processing, first, an image obtaining unit 601 obtains an image that the image capturing apparatus 541 has obtained by a sensor. A development unit 602 converts the image obtained by the image obtaining unit 601 into a predetermined format by processing to be described later. Calculation of the dynamic range of the brightness of the image data is also performed here, and a value representing the calculated dynamic range is input to a dynamic range obtaining unit 605. The information of a sheet to perform printing, which is obtained by a sheet information obtaining unit 603, and the information of an environment (observation condition) to observe a printed product, which is obtained by an observation environment obtaining unit 604 are also input to the dynamic range obtaining unit 605 in addition to the value representing the dynamic range. In one example, the dynamic range obtaining unit 605 can specify the range of the dynamic range of the brightness in the output based on the information of the sheet and the information of the observation environment. The dynamic range obtaining unit 605 obtains the dynamic range of the brightness for each of the thus obtained input and output, and outputs the information to a dynamic range compression unit 608.

A brightness/color difference separation unit 606 separates the developed image data into a brightness component (brightness image) and color difference components (color difference image), inputs the brightness image data after the separation to a frequency separation unit 607, and inputs the color difference image data to a brightness/color difference combining unit 611. The frequency separation unit 607 specifies the spatial frequency of the brightness image, and separates the image into a high-frequency component and a low-frequency component based on the specified spatial frequency. The frequency separation unit 607 outputs the low-frequency component after the separation to the dynamic range compression unit 608, and outputs the high-frequency component to a contrast correction unit 609. The dynamic range compression unit 608 executes processing of compressing the dynamic range of the brightness using the image data from the development unit 602 based on the value within the range of the dynamic range of the brightness obtained by the dynamic range obtaining unit 605. The contrast correction unit 609 executes contrast correction for the input high-frequency component.

After the processing for each frequency component, a frequency combining unit 610 combines the data of the high-frequency component and the data of the low-frequency component, and obtains brightness image data after the processing. The brightness/color difference combining unit 611 combines the brightness image data after the processing and the color difference image data, thereby generating output image data. A print processing unit 612 executes processing for printing for the output image data, and transmits the data after the processing to the printing apparatus 521.

The procedure of the processing by the functional arrangement shown in FIG. 6 will be described with reference to FIG. 7. In the processing shown in FIG. 7, first, the image obtaining unit 601 obtains captured image data (step S701). The image data obtained here is not general-purpose data in the JPEG format or the like, which has undergone predetermined processing, but so-called RAW data obtained by image capturing. After that, the development unit 602 executes development processing for the image data (step S702). This development processing will be described with reference to FIG. 8.

In the development processing, the development unit 602 first executes color interpolation processing by de-Bayer processing or mosaic processing for each of the pixels in the RAW data formed by single-color signals (step S801). By this processing, the RAW data is converted into R, G, and B image signal values. After that, the development unit 602 executes white balance processing in accordance with preset development settings (step S802). In the white balance processing, R, G, and B signal values are multiplied by set coefficients. Then, the development unit 602 executes gamma processing in consideration of the development settings and the characteristic of a display device (step S803). The development unit 602 executes noise removal and sharpness processing by filter processing as needed based on user settings and image capturing conditions (steps S804 and S805). The development unit 602 then executes color conversion processing (step S806). In the color conversion processing, conversion to a predetermined defined color space, adjustment of the hue, and suppression processing of color bending in a high brightness area are applied. With the above-described development processing, R, G, and B images each having a desired gamma value are generated.

Referring back to FIG. 7, the dynamic range obtaining unit 605 obtains the brightness data of the bright and dark portions of the input image (step S703). The brightness data of the bright portion is specified based on a value calculated from camera information included in the obtained image data and values calculated from the settings at the time of image capturing and a value extended by the development processing in step S702. The value extension can be executed by, for example, white balance processing in step S802 of FIG. 8. At the time of white balance processing, substitution processing according to the saturation level and pixel information is executed, thereby extending the gray scale of the high brightness area (N stages: N≥1). Japanese Patent Laid-Open No. 2015-156615 describes such extension processing of the gray scale of a high brightness area.

FIG. 9A shows a table of brightness values of a bright portion corresponding to the combinations of camera information and settings at the time of image capturing. In this table, different pieces of model information (in this example, three models "A", "B", and "C") of cameras are shown in the vertical direction, and the modes (image capturing settings) of the cameras are shown in the horizontal direction. Here, as the modes of the cameras, a normal mode and a high brightness obtaining mode in which image capturing is performed under an exposure condition darker by one step in the settings of the cameras are shown. Note that the table of FIG. 9A is merely an example, and image capturing settings other than these may be defined. A value "R" shown in the table is the brightness value (unit: %, a relative value in a case in which the measured brightness is 18%) of a high brightness portion. Based on the value R and the information representing that extension of N stages is possible, which is obtained by the development processing in step S702, a brightness value Yi(W) of the bright portion of the final input image is calculated by $$Yi(W)=R\times 2^N \quad (7)$$

On the other hand, a dark portion brightness Yi(D) of the input image is a value for which the absence of entering of light is assumed. Hence, Yi(D)=0 holds independently of the settings.

In addition, the dynamic range obtaining unit 605 obtains the brightness data of the bright and dark portions on the output side (step S704). FIG. 9B shows a table of brightness values for each sheet to output (print) an image. In this table, paper types are shown in the vertical direction, and black portions Yo(D) and paper white portions Yo(W) are shown in the horizontal direction. Each value shown in the table is a brightness value [nit], and has a value (white serving as a reference≈100 [nit]) obtained under a predetermined general illumination environment. A value converted in consideration of the visual characteristic may be used as this value.

Next, the brightness/color difference separation unit 606 separates each of the R, G, and B signal values into the information of a brightness (Y) and the information of color differences (CbCr) (step S705). This separation is performed for each pixel by conversion using $$Y=0.299 \times R+0.587 \times G+0.114 \times B$$

$$Cb=-0.16874 \times R-0.33126 \times G+0.5 \times B$$

$$Cr=0.5 \times R+0.41869 \times G-0.081 \times B \qquad (8)$$

The frequency separation unit 607 separates the brightness value image separated in step S705 into a low-frequency component image and a high-frequency component image (step S706). To generate, for example, the low-frequency component image, the frequency separation unit 607 applies a low-pass filter to the input brightness value image. In this processing, for example, a spatial filter may be applied to the brightness value image. Alternatively, the brightness value image may be converted into a spatial frequency image by FFT, filter processing may be executed for the spatial frequency image, and after that, the image may be returned to the brightness value image by IFFT. Note that FFT is short for fast Fourier transformation, and IFFT is short for inverse fast Fourier transformation. A frequency as a passband can be decided based on the sheet size or the observation distance when appreciating a printed product and in consideration of the visual characteristic of a human. On the other hand, to generate the high-frequency component image, the frequency separation unit 607 may apply a high-pass filter to the brightness value image, or the low-frequency component image obtained in the above-described way may be subtracted from the original image.

The dynamic range compression unit 608 executes dynamic range compression processing for the low-frequency component image obtained in step S706 based on the information of the bright and dark portions of the input and the output obtained in steps S703 and S704 (step S707). Details of this processing will be described later.

The contrast correction unit 609 performs contrast correction processing for the high-frequency component image obtained in step S706 (step S708). In this processing, the input high-frequency component image is multiplied by a coefficient k. In a case in which an expression close to the scene at the time of image capturing is requested, k=1±Δ (Δ is 0 or a sufficiently small predetermined value) is set. In a case in which degradation such as bleeding of ink of a printed product is taken into consideration, k is set to a higher value.

The frequency combining unit 610 combines the low-frequency component image that has undergone the dynamic range compression in step S707 and the contrast-corrected high-frequency component image, thereby obtaining a brightness value image compressed to a predetermined dynamic range and also contrast-corrected (step S709). After that, the brightness/color difference combining unit 611 combines the color difference components with the brightness value image obtained in step S709 (step S710), and converts the values into R, G, and B signals using $$R=Y+1.402 \times Cr$$

$$G=Y-0.34414 \times Cb-0.71417 \times Cr$$

$$B=Y+1.772 \times Cb \qquad (9)$$

Then, the print processing unit 612 performs image processing for printing for the R, G, and B signal values obtained by equations (9) and outputs them (step S711).

Figure 10:
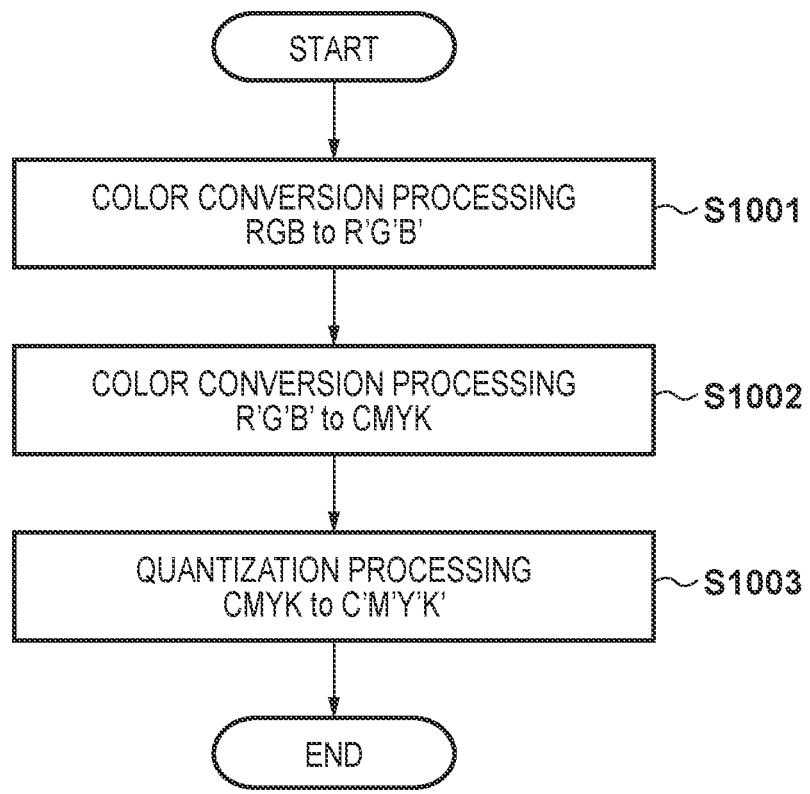
FIG. 10 is a flowchart showing an example of the procedure of print processing.

The procedure of print processing will be described next with reference to FIG. 10. First, the print processing unit 612 executes color conversion processing (step S1001). Accordingly, the R, G, and B values of each pixel of the image obtained in step S710 are converted into R', G', and B' values suitable for the color of the sheet set by the user in advance. This conversion can be executed by various methods. In general, a lookup table in which a value to be converted is defined in correspondence with a discrete lattice point is used. Then, the print processing unit 612 converts the R', G', and B' values obtained by the conversion into ink colors to be actually used in printing (step S1002). In this processing as well, conversion based on, for example, a lookup table optimized for each set sheet is performed. Note that in the example shown in FIG. 10, a case in which C, M, Y, and K (C: cyan ink, M: magenta ink, Y: yellow ink, and K: black ink) are used will be described. However, the present invention is not limited to this. That is, in step S1002, conversion processing according to the number of inks to be used in printing is performed. After that, the print processing unit 612 converts the values converted in step S1002 into the number of gray scale tones that the printing apparatus 521 can receive to execute printing (step S1003). This conversion is performed by, for example, error diffusion processing or dither processing. In one example, for photo printing, error diffusion processing or processing using a dither matrix with a blue noise characteristic is executed. The data converted into the number of gray scale tones is transferred to the printer, thereby executing printing. Note that the described processes are merely examples, and a case in which an ICC (International Color Consortium) profile is used also applies to this.

Figure 7:
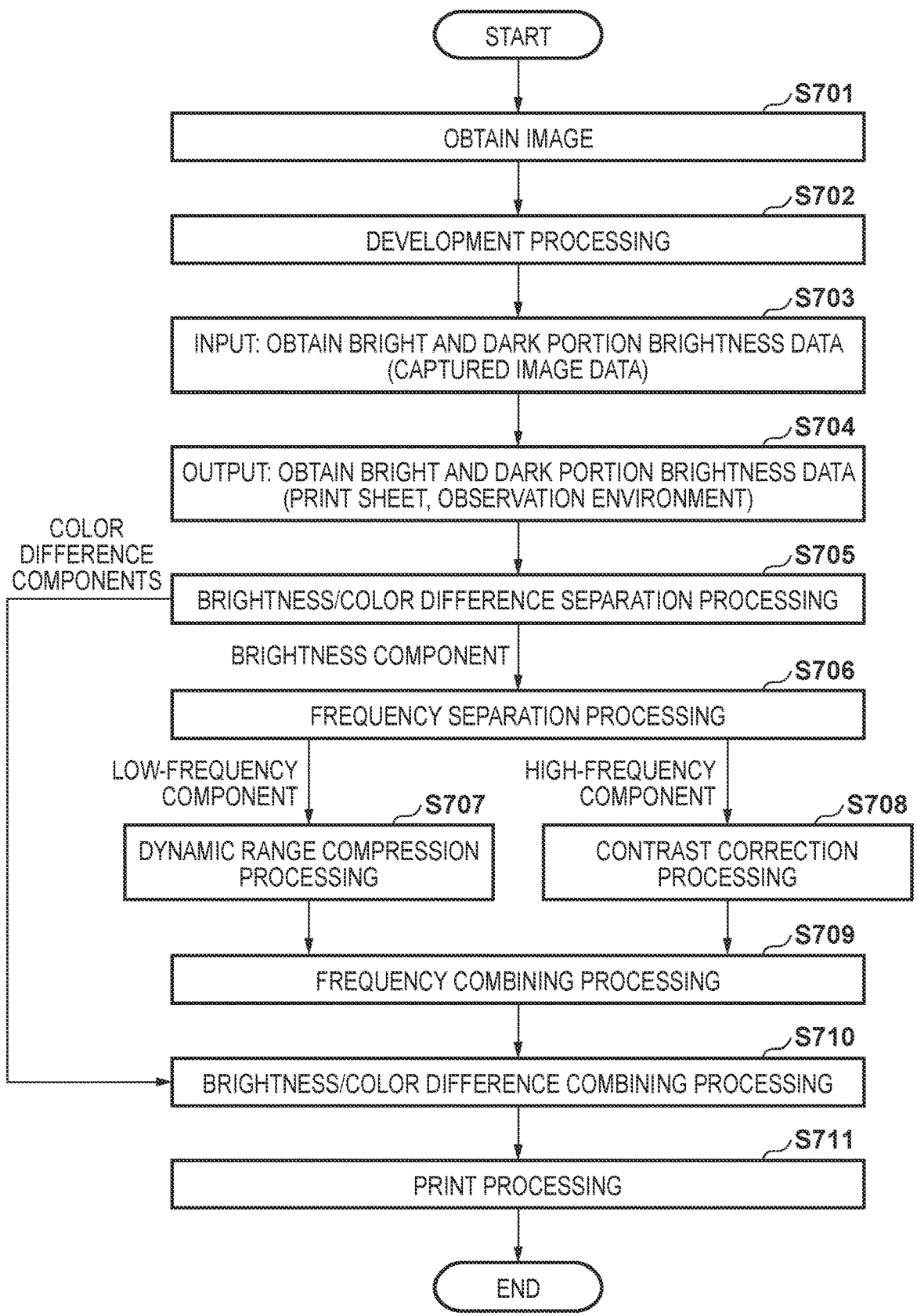
FIG. 7 is a flowchart showing an example of the procedure of processing until an image is printed.

When processing from development of an obtained image to printing is executed by the processing as shown in FIG. 7, processing considering the paper type and the observation environment is executed for the dynamic range of the image of the printing target. With this processing, even if image quality degradation occurs due to dynamic range compression, it is possible to implement a printed product in which the influence of the image quality degradation is suppressed.

(Dynamic Range Compression Processing of Brightness)

Several examples of the procedure of dynamic range (D range) compression processing of a brightness executed in step S707 described above will be described below.

Processing Example 1

Figure 11:
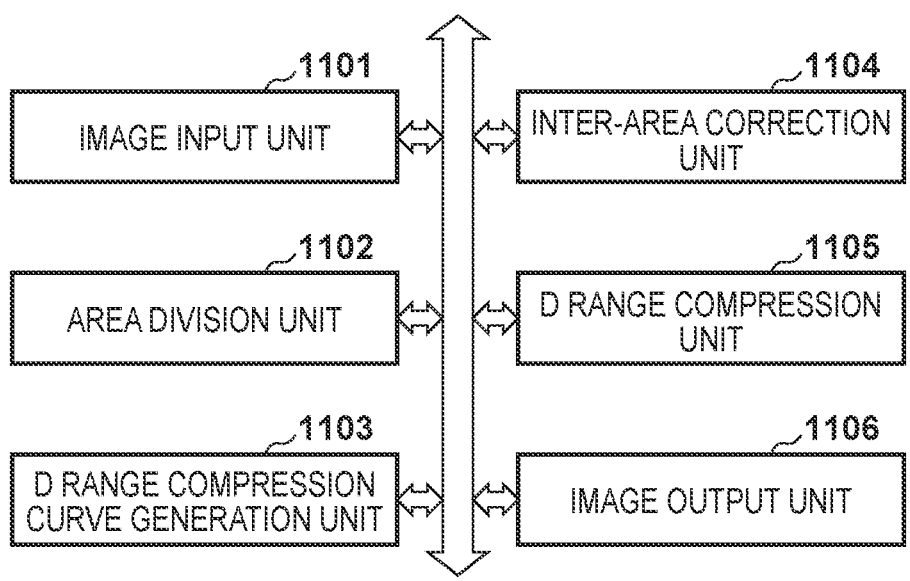
FIG. 11 is a view showing an example of the functional arrangement for dynamic range compression.

A first processing example will be described with reference to the block diagram of FIG. 11 and the flowchart of FIG. 12. FIG. 11 shows an example of the arrangement of an image processing function provided in the image processing apparatus 501 to accept HDR image data as an input, perform D range compression for the image data, and output the image data after the D range compression to the printing apparatus 521.

Figure 12:
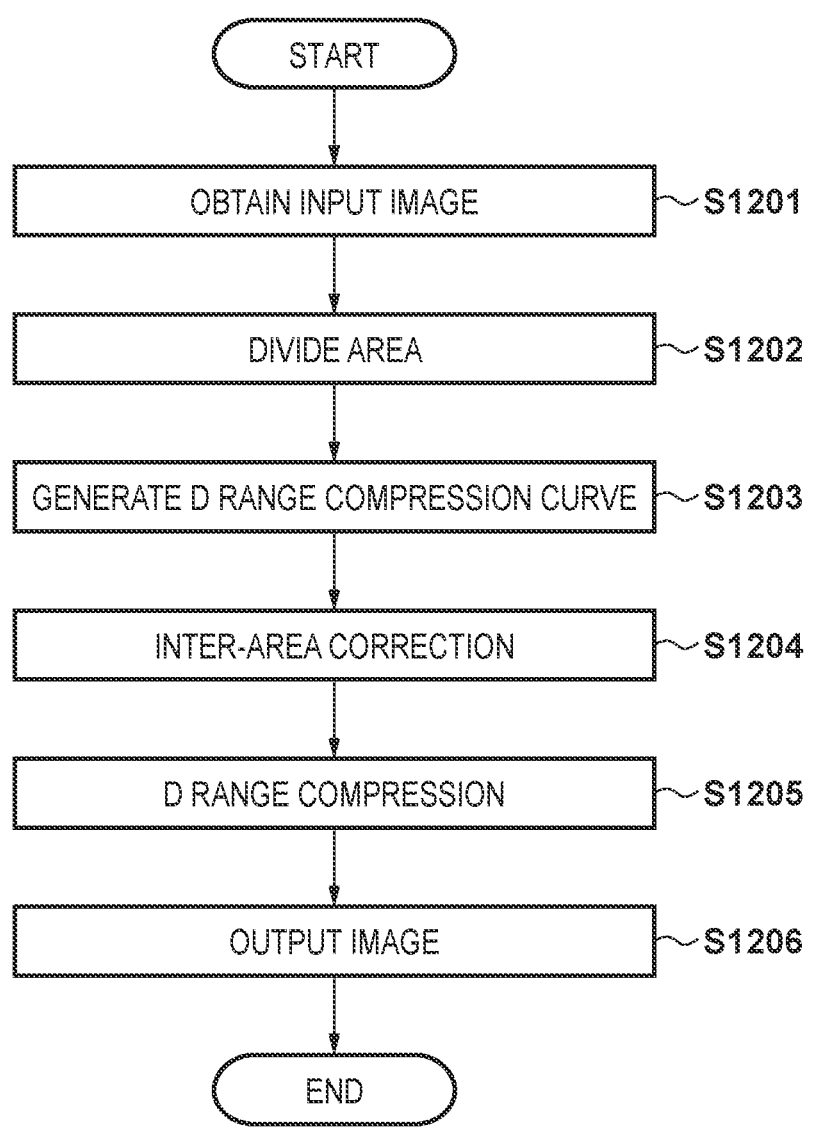
FIG. 12 is a flowchart showing an example of the procedure of dynamic range compression processing.
Figure 13:
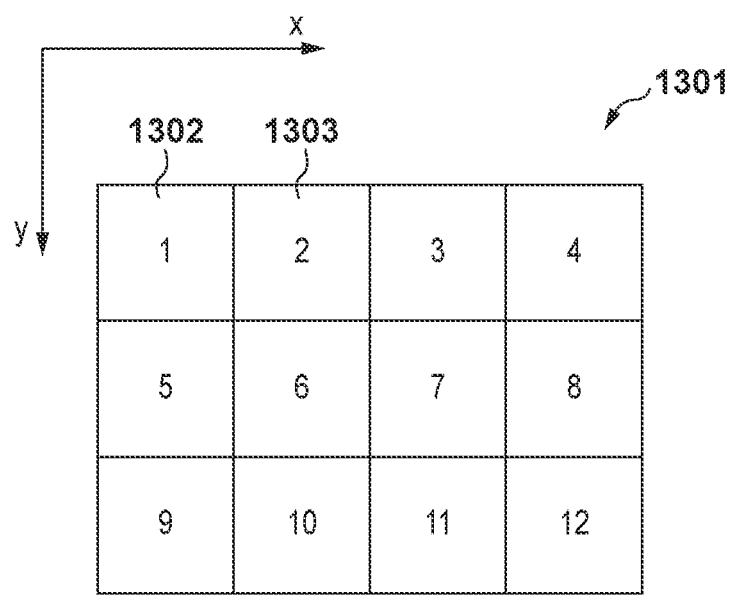
FIG. 13 is a view showing the outline of area division of an image.

Referring to FIG. 12, first, an image input unit 1101 obtains HDR image data (step S1201). Note that in this example, the obtained HDR image data is RGB data with a D range of 1,000 nit. As one example, the HDR image data input by the image input unit 1101 is represented by an input image 1301 shown in FIG. 13. An area division unit 1102 divides the input image 1301 into a plurality of areas (step S1202). In this example, as shown in FIG. 13, the input image 1301 is divided into four areas in the x direction and three areas in the y direction, that is, a total of 12 areas. Note that in this example, the divided areas need not have an even size, and at least some areas may have a size different from other areas.

Figure 14A:
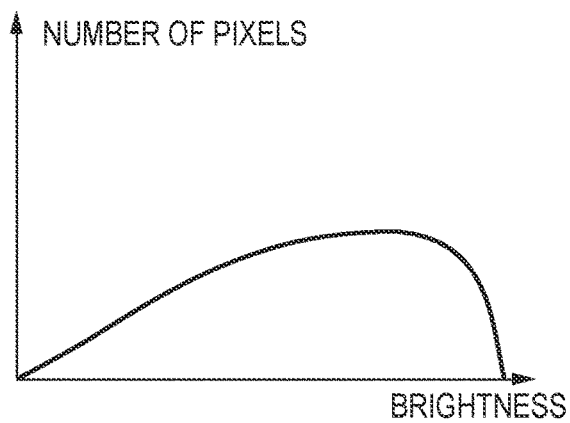
FIGS. 14A to 14D are views showing examples of brightness value distributions and dynamic range compression curves for the areas of the image.
Figure 14C:
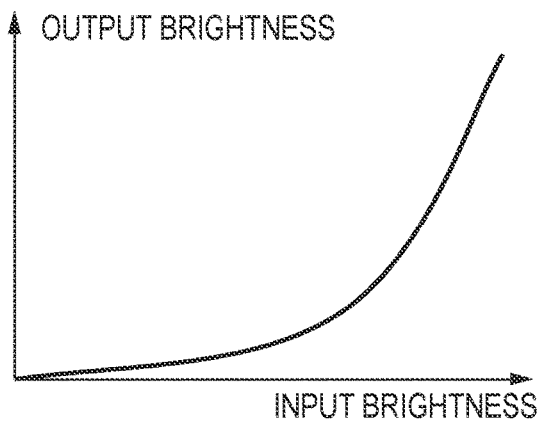
Figure 14B:
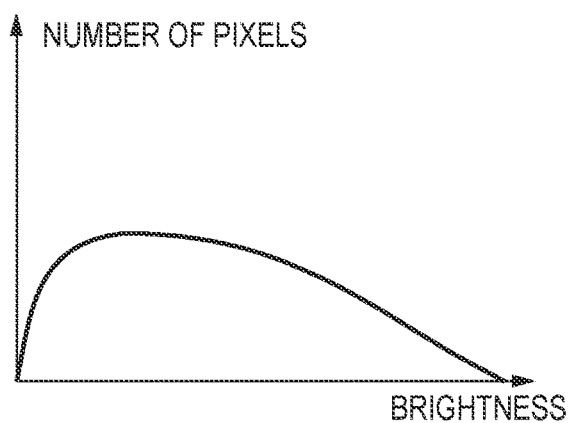
Figure 14D:
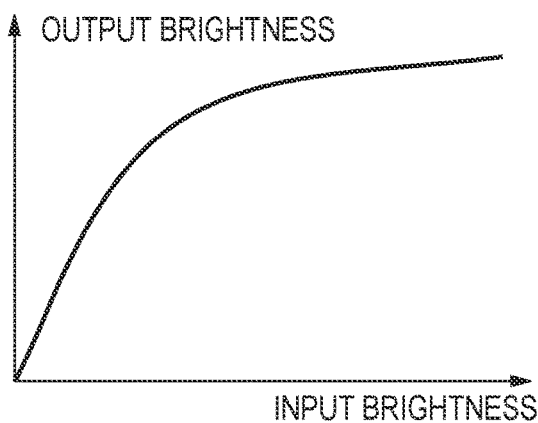

A D range compression curve generation unit 1103 generates a one-dimensional lookup table (to be referred to as "LUT" hereinafter) to perform D range compression for each of the areas divided by the area division unit 1102. Note that not an LUT but arbitrary relationship information that associates an input brightness value with an output brightness value may be generated. A method of generating D range compression curves to be applied to areas 1302 and 1303 will be described with reference to FIGS. 14A to 14D. First, the histograms of brightness values in the areas 1302 and 1303 are represented as shown in FIGS. 14A and 14B. That is, in the area 1302, many pixels are distributed in a high brightness value area, as shown in FIG. 14A, and there are many bright pixels. In the area 1303, many pixels are distributed in a low brightness value area, as shown in FIG. 14B, and there are many dark pixels. For such a histogram, a cumulative curve that accumulates the number of pixels in the brightness order is defined as a D range compression curve. The D range compression curves of the areas 1302 and 1303 are shown in FIGS. 14C and 14D. Here, the input brightness range and the output brightness range are normalized along the abscissa and the ordinate in each of FIGS. 14C and 14D. In actual use, each D range compression curve is used in correspondence with the input brightness range and the output brightness range. For example, scaling to set the input brightness range to 1 [nit] to 1,000 [nit] and the output brightness range to 5 [nit] to 90 [nit] can be performed. Note that the D range compression curve may be decided not by the method of doing accumulation in the brightness order but by a method of increasing the gradient of the curve in descending order of the frequency of the brightness histogram.

Referring back to FIG. 12, an inter-area correction unit 1104 executes inter-area correction of the lookup tables to perform correction to reduce the influence of image quality degradation caused by the difference of the LUTs between adjacent areas generated by the D range compression curve generation unit 1103 (step S1204). This correction processing will be described later. Then, a D range compression unit 1105 performs D range compression using the lookup table (LUTp for a pixel P to be described later) for each pixel, which is corrected by the inter-area correction unit 1104. An image output unit 1106 outputs the image data that has undergone the D range compression by the D range compression unit 1105 to the printing apparatus 521 (step S1206).

(Inter-Area Correction Processing)

The method of inter-area correction executed in step S1204 described above will be described next in detail with reference to FIGS. 15, 16A, and 16B. In this processing example, as the inter-area correction, each D range compression curve (LUT) generated in step S1203 is corrected using the information between the areas.

Figure 15:
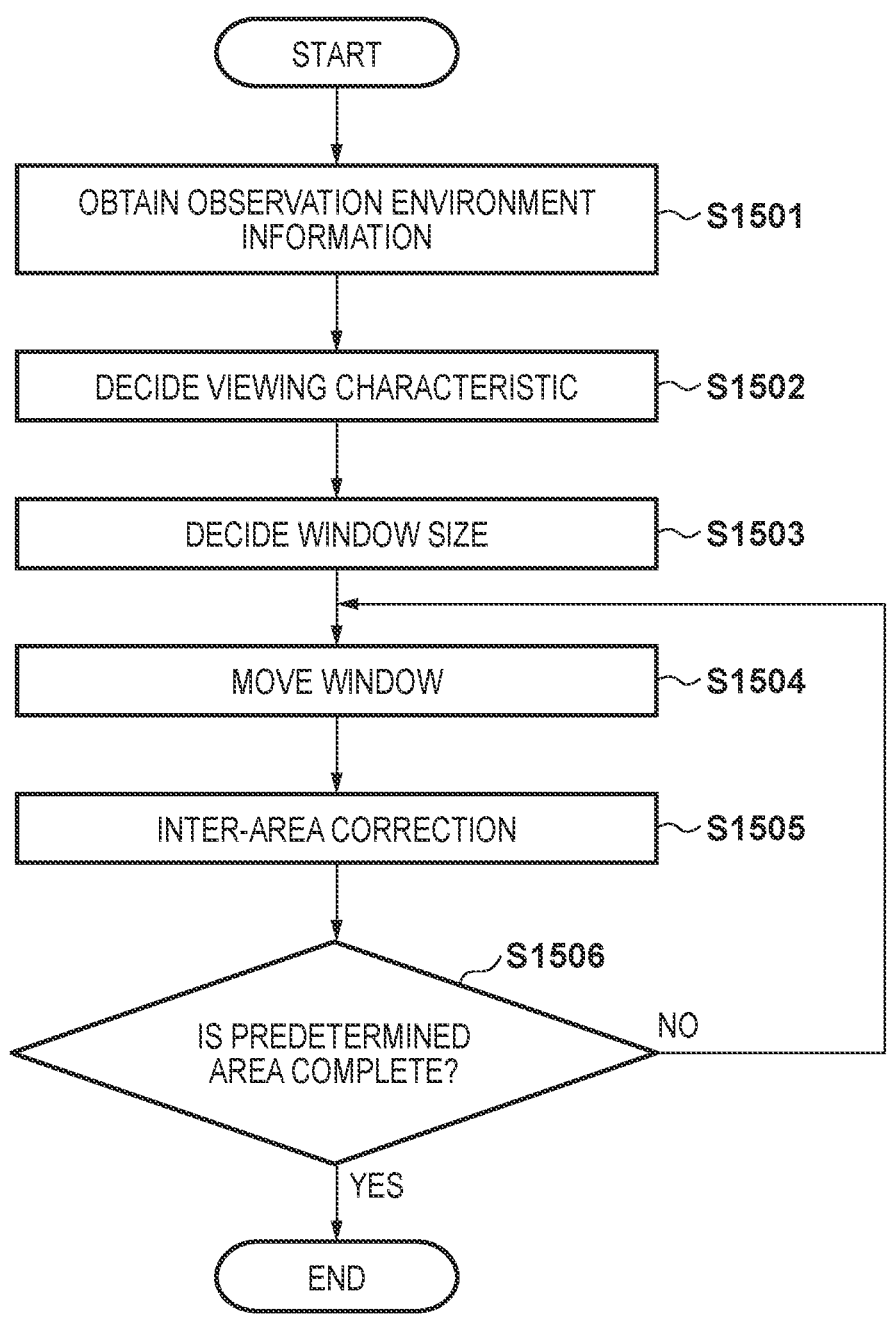
FIG. 15 is a flowchart showing an example of the procedure of inter-area correction processing.
Figure 16A:
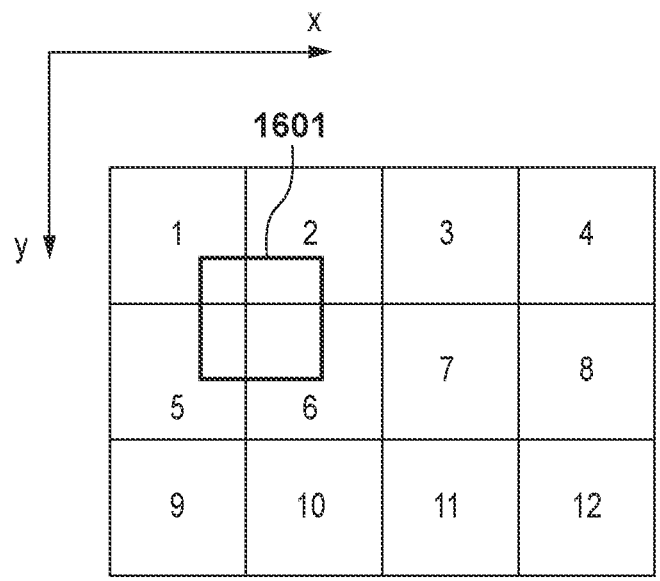
FIGS. 16A and 16B are views for explaining pixels used in the inter-area correction.

When the processing shown in FIG. 15 is started, the inter-area correction unit 1104 first obtains observation environment information (step S1501). The observation environment information is information representing an environment when the user observes an output object output by the printing apparatus 521. The observation environment information includes at least one of, for example, an observation distance when observing the output object, the resolution of the output object, and the information of the brightness of the output object to be observed. The inter-area correction unit 1104 obtains the observation environment information based on, for example, user operation information obtained, via the input I/F 506, from the user who operates the host PC. Alternatively, the inter-area correction unit 1104 may obtain the observation environment information by reading out, from the HDD 504, observation environment information set in advance and saved in the HDD 504.

Next, the inter-area correction unit 1104 specifies the viewing characteristic of the contrast from the obtained observation environment information (step S1502). Here, letting d [mm] be the distance to observe the output object, and r [dpi] be the resolution of the output object, pixels per degree P [pixel/deg] can be given by $$P = 1 \bigg/ \frac{180}{\pi} \tan^{-1}\left(\frac{\left(\frac{25.4}{r}\right)}{d}\right) \quad (10)$$

Let S be the spatial frequency to be evaluated. The spatial frequency S can be decided using the Barten model shown in FIG. 4 and the brightness of the output object obtained in step S1501. For example, when the brightness of the output object obtained in step S1501 is 10 [nit], 2 [cycles/deg] at which the contrast sensitivity peaks is decided as the spatial frequency S. In addition, when the brightness is 100 [nit], 3 [cycles/deg] at which the contrast sensitivity peaks is decided as the spatial frequency S.

After that, the inter-area correction unit 1104 decides a window size when correcting the D range compression curve (step S1503). As one example, the window here is a frame that specifies pixels within a predetermined area, like a window 1601 shown in FIG. 16A. Scanning in the x and y directions using the window 1601 is performed for the input image, and the D range compression curve for each pixel is corrected.

Let S [cycles/deg] be the spatial frequency to be evaluated. A window size W [pixels] can be calculated by $$W = \frac{P}{2*S} \quad (11)$$

For example, assume that the spatial frequency that is the viewing characteristic decided in step S1502 is 2 [cycles/deg], the resolution of the output object is 300 [dpi], and the distance to observe is 300 [mm]. In this case, the window size W is calculated as 16 [pixels] from equations (10) and (11).

The inter-area correction unit 1104 sets the window 1601 at a pixel position as the correction target (step S1504). An example of a case in which the window size is set to a size of 5 pixels in the x direction×5 pixels in the y direction in step S1503, as shown in FIG. 16B, will be described below. A D range compression curve for the pixel P of interest located at the center of the window is the correction target.

The inter-area correction unit 1104 corrects the D range compression curve for the pixel P of interest (step S1505). Here, as shown in FIGS. 16A and 16B, the window 1601 is arranged over area 1, area 2, area 5, and area 6 with respect to the pixel P of interest as the center. At this time, an area 1602, an area 1603, an area 1604, and area 1605 are included in 25 pixels=5 pixels×5 pixels extracted by the window 1601. The area 1602 is an area where area 1 shown in FIG. 16A and the window 1601 overlap, and the area 1603 is an area where area 2 shown in FIG. 16A and the window 1601 overlap. Similarly, the area 1604 and the area 1605 are, respectively, areas where area 5 and area 6 in FIG. 16A and the window 1601 overlap. The areas 1602 to 1605 will be referred to as correction window areas hereinafter. Note that processing performed in a case in which the window 1601 is arranged over four areas, as shown in FIG. 16B, will be described below. The same processing is performed in a case in which the window 1601 is arranged over two or more areas. Note that if the whole range of the window 1601 set for a certain pixel is included in the range of one area, inter-area correction need not be performed for the pixel.

FIGS. 17A and 17B are views for schematically explaining an LUT combining method for generating the D range compression curve for the pixel P of interest. Let LUTp be the D range compression curve of the pixel P of interest. LUTp is combined using a weight α corresponding to each correction window area. Here, the LUTs of the four window areas (areas 1602 to 1605) shown in FIG. 16B have values shown in FIG. 17A.

Figure 16B:
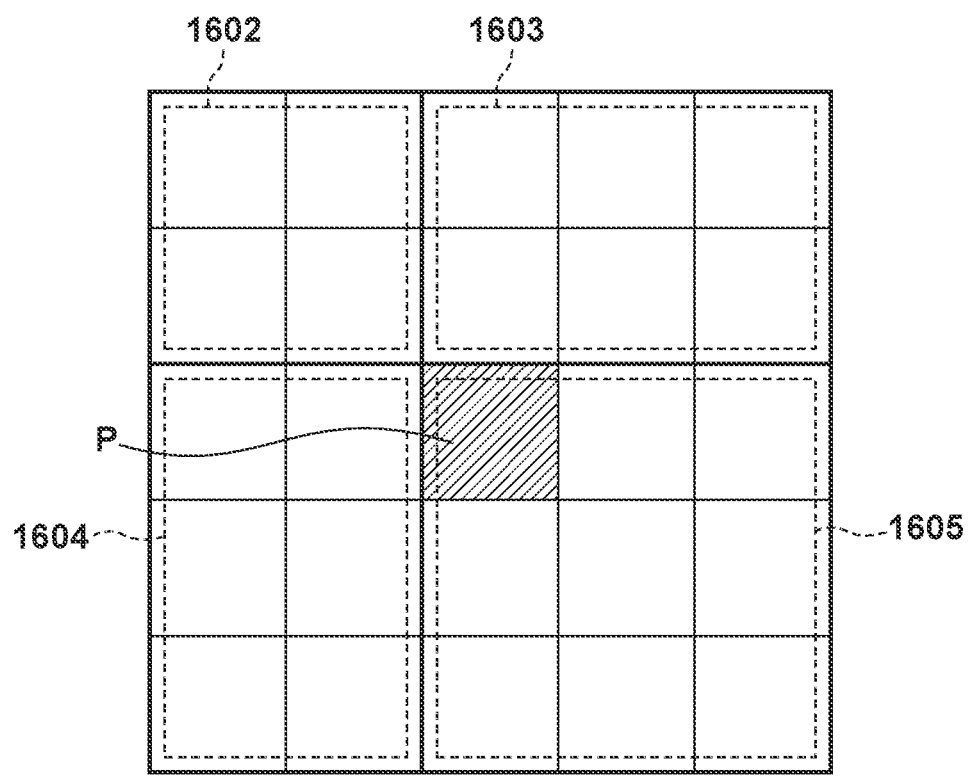

As shown in FIG. 16B, the size ratio of the four window areas (areas 1602 to 1605) is (area 1602):(area 1603):(area 1604):(area 1605)=4:6:6:9. In this case, the inter-area correction unit 1104 sets weights $\alpha_{1602}$, $\alpha_{1603}$, $\alpha_{1604}$, and $\alpha_{1605}$ corresponding to the areas 1602 to 1605 to 4/25, 6/25, 6/25, and 9/25 as size ratios, respectively. The inter-area correction unit 1104 combines the LUTs using the set weights $\alpha_{1602}$ to $\alpha_{1605}$. This combining is performed by weighted addition by multiplying the output value of each LUT by a weight and adding the values, as indicated by $$V_P = \alpha_{1602}V_{1602} + \alpha_{1603}V_{1603} + \alpha_{1604}V_{1604} + \alpha_{1605}V_{1605} \quad (12)$$

where $V_{1602}$ to $V_{1605}$ are the values of LUTs in the areas 1602 to 1605, respectively, and $V_P$ is the value of the corrected LUT applied to the pixel P of interest. For example, according to equation (12) described above, the output value in a case in which the input is "1" is calculated as $$1 \times \frac{4}{25} + 2 \times \frac{6}{25} + 3 \times \frac{6}{25} + 5 \times \frac{9}{25} = 3 \quad (13)$$

Similarly, equation (12) described above is applied to other input values as well, and LUTp for the pixel of interest is specified as shown in FIG. 17B. In this way, the D range compression curve of each pixel can be generated by weighted addition using a weight according to the size ratio of each correction window area.

Note that the weight α may be calculated not based on the size ratio of the correction window area but based on the difference between the average brightness value of each area and the brightness value of the pixel P of interest. For example, assume that the average brightness values of the areas 1602 to 1605 are 1,000 [nit], 600 [nit], 400 [nit], and 100 [nit], and the brightness value of the pixel P of interest is 200 [nit]. At this time, the differences between the average brightness values of the areas and the brightness value of the pixel P of interest are 800 [nit], 400 [nit], 200 [nit], and 100 [nit]. An area for which the difference value is small probably has a characteristic close to the pixel P of interest. Hence, the value of the LUT for such an area is reflected on the value of the LUT after correction more strongly than the value of the LUT for an area with a large difference value. To do this, here, the reciprocal of the difference value is used as the value α. That is, $(\alpha_{1602}, \alpha_{1603}, \alpha_{1604}, \alpha_{1605}) = \beta \times (1/800, 1/400, 1/200, 1/100)$ is set. Here, β is a coefficient used to set the sum of the coefficients α to 1. In this case, β is decided such that $(15/800) \times \beta = 1$ is set. As a result, $(\alpha_{1602}, \alpha_{1603}, \alpha_{1604}, \alpha_{1605}) = (1/15, 2/15, 4/15, 8/15)$ is set.

Note that in this above-described example, an example in which the weight α is set based on one of the brightness difference ratio and the size ratio of the correction window area has been described. However, the weight may be set using both of them. For example, the product of a weight specified from the size ratio and a weight specified from the brightness difference ratio may be set as the weight.

Referring back to FIG. 15, the inter-area correction unit 1104 determines whether the inter-area correction of step S1505 is completed for all pixels in a predetermined area (step S1506). The predetermined area is an area defined by at least some pixels of the input image, and is, for example, an area included in a range up to a pixel spaced apart from the boundary of a divided area by a predetermined number. If the inter-area correction is completed for all pixels in the predetermined area (YES in step S1506), the inter-area correction unit 1104 ends the processing. On the other hand, if the inter-area correction is not completed for all pixels in the predetermined area (NO in step S1506), the inter-area correction unit 1104 returns the process to step S1504 to move the window area and continue the inter-area correction processing (step S1505).

As described above, in this processing example, the D range compression curve of the pixel of interest is corrected using the D range compression curves of peripheral areas defined by the window having a predetermined size, thereby reducing image quality degradation that occurs at the boundary between the areas. At this time, the viewing characteristic is set using the visual characteristic and the observation environment information, and a window having a size capable of correcting the frequency defined by the viewing characteristic is set, thereby reducing the influence of image quality degradation in consideration of the visual characteristic.

Processing Example 2

A second processing example will be described next with reference to FIG. 18. Note that the same step numbers as in FIG. 12 denote the same processes in FIG. 18, and a detailed description thereof will be omitted. In step S1801, the D range compression unit 1105 compresses the D range of the input image using the LUT created in step S1203. In step S1802, the inter-area correction unit 1104 executes inter-area correction for the pixels in each area that has undergone the D range compression. That is, in Processing Example 1, inter-area correction of the D range compression curve is executed, and after that, D range compression of the image is executed. In this processing example, however, inter-area correction is executed after a D range compression curve is applied to each pixel included in each area.

The correction method of inter-area correction in step S1802 will be described. In this processing, the brightness of the pixel P of interest that has undergone D range compression in step S1801 is corrected. Note that the same processing as that shown in FIG. 15 is executed except that the calculation of inter-area correction is executed as indicated by equation (14) to be described later. For the pixel P of interest located at the center of the window 1601 as shown in FIGS. 16A and 16B, using the weight α corresponding to each correction window areas and an average brightness Y of the correction window areas, a brightness Yp after the inter-area correction is calculated by $$Y_P = \alpha_{1602}Y_{1602} + \alpha_{1603}Y_{1603} + \alpha_{1604}Y_{1604} + \alpha_{1605}Y_{1605} \quad (14)$$

Here, the weight α of equation (14) is set based on at least one of the size ratio of the window area and the brightness difference between the input average brightness of the window area and the brightness of the pixel P of interest, as in Processing Example 1. In addition, Y of each area can be the average brightness value of a correction window area (an area where a divided area and the window overlap), but may be the average brightness value of the whole divided area including the correction window area. For example, $Y_{1602}$ can be the average pixel value of the area 1602 shown in FIG. 16B. However, the average pixel value of area 1 shown in FIG. 16A may be used.

As described above, in this processing example, the brightness value of the pixel of interest is corrected using the average brightness values of peripheral areas defined by the window having a predetermined size, thereby reducing image quality degradation that occurs at the boundary between the areas. At this time, the viewing characteristic is set using the visual characteristic and the observation environment information, and a window having a size capable of correcting the frequency defined by the viewing characteristic is set, thereby reducing the influence of image quality degradation in consideration of the visual characteristic.

Processing Example 3

Figure 19:
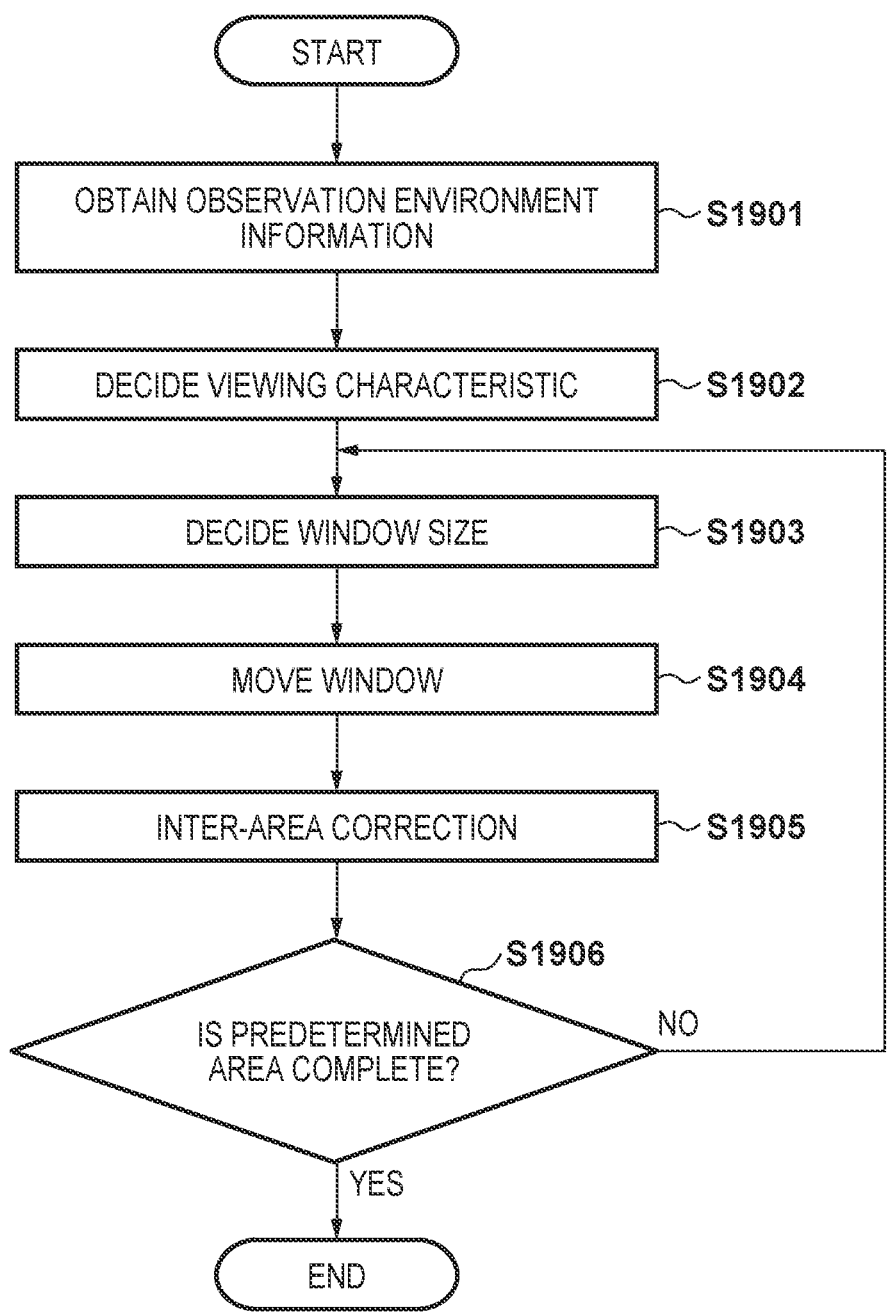
FIG. 19 is a flowchart showing an example of the procedure of inter-area correction processing.

A third processing example will be described with reference to FIG. 19. Note that D range compression processing is the same as in Processing Examples 1 and 2, and a detailed description thereof will be omitted. In this processing example, in step S1901, the frequency of the input image is obtained as observation environment information. The frequency of the input image is detected using Laplacian filters of different sizes. FIG. 20A shows a Laplacian filter having a size of 3×3, and FIG. 20B shows a Laplacian filter having a size of 5×5. A high frequency is detected by the Laplacian filter of the small filter size, and a low frequency is detected by the Laplacian filter of the large size. Each Laplacian filter is applied to each pixel of the input image. A larger one of the values of results after the application can be defined as the frequency of the pixel. In this example, the frequency of the input image obtained in step S1901 is set as the viewing characteristic (step S1902). A window size used when correcting a D range compression curve is decided from the viewing characteristic set in step S1902 (step S1903). The window size is, for example, the size (for example, 5×5 for a low frequency or 3×3 for a high frequency) of the filter used when the frequency set as the viewing characteristic is detected in step S1901. In steps S1904 and S1905, the window is set at a pixel position as the correction target, and the D range compression curve the pixel P of interest is corrected, as in steps S1504 and S1505 of FIG. 15.

After that, it is determined whether the inter-area correction of step S1905 is completed for all pixels of the predetermined area (step S1906). If the inter-area correction is completed for all pixels of the predetermined area (YES in step S1906), the processing is ended. On the other hand, if the inter-area correction is not completed for at least some pixels of the predetermined area (NO in step S1906), the process returns to step S1903 to repeat the series of processing from the window size decision processing.

As described above, in this processing example, for the brightness value of the pixel of interest, inter-area correction is performed using a window set for each pixel, thereby reducing image quality degradation that occurs at the boundary between the areas. At this time, the viewing characteristic is set from the frequency of the input image, and a window having a size capable of correcting the frequency defined by the viewing characteristic is set, thereby reducing the influence of image quality degradation in consideration of the visual characteristic.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125282, filed Jun. 29, 2018, which is hereby incorporated by reference herein in its entirety.

What is claimed is:

1. An image processing apparatus comprising:
at least one processor; and
at least one memory coupled to the at least one processor, wherein the at least one memory stores an instruction that causes, when executed by the at least one processor, the image processing apparatus to:
(1) divide a first image into a plurality of areas based on obtained image data of the first image corresponding to a first brightness, and set, for each of the plurality of areas, relationship information that associates an input brightness value with an output brightness value;
(2) specify at least some pixels of the first image, wherein the at least some pixels belong to adjacent areas of the plurality of areas respectively;
(3) convert, based on the relationship information, a brightness value of a pixel included in the first image into a brightness value of a pixel of a second image which corresponds to a brightness range narrower than a brightness range to which the first image corresponds by determining a brightness value, for each of the at least some pixels, in the second image such that (a) a brightness value for one pixel of the at least some pixels is determined based on the relationship information set for respective areas to which each of the at least some pixels belongs and (b) a brightness value for another pixel of the at least some pixels is determined based on the relationship information set for the respective areas.

2. The apparatus according to claim 1, wherein the instruction further causes, when executed by the at least one processor, the image processing apparatus to, in the conversion:
specify an average brightness value of the brightness values for each of the plurality of areas; and
perform, for each of the at least some pixels, weighted addition of the average brightness values for the adjacent areas in the plurality of areas, thereby calculating the brightness value of the pixel in the second image.

3. The apparatus according to claim 1, wherein the instruction further causes, when executed by the at least one processor, the image processing apparatus to, in the specifying, specify the at least some pixels of the first image based on information of an environment that includes information on an observation distance when observing the second image.

4. The apparatus according to claim 1, wherein the instruction further causes, when executed by the at least one processor, the image processing apparatus to, in the specifying, specify the at least some pixels of the first image based on information of an environment that includes a frequency of the first image.

5. The apparatus according to claim 1, wherein the instruction further causes, when executed by the at least one processor, the image processing apparatus to set, for each of the plurality of areas, the relationship information such that respective output brightness values associated with a predetermined input brightness value in the relationship information each of the plurality of areas are different each other.

6. The apparatus according to claim 1, wherein the instruction further causes, when executed by the at least one processor, the image processing apparatus to set the relationship information for each of the plurality of areas based on a distribution of the brightness values of pixels in the respective areas.

7. The apparatus according to claim 1, wherein the instruction further causes, when executed by the at least one processor, the image processing apparatus to, in the specifying, specify the at least some pixels of the first image based on information of an environment that includes information on a resolution of the second image.

8. The apparatus according to claim 7, wherein the information of the environment further includes a brightness of the second image.

9. The apparatus according to claim 1, wherein the instruction further causes the image processing apparatus to (a) set a scope including parts of the respective adjacent areas and (b) in the specifying, specify pixels included in the scope and the parts of the respective adjacent areas as the at least some pixels.

10. The apparatus according to claim 9, wherein the instruction further causes the image processing apparatus to determine a size of the scope based on information of an environment when the second image is observed.

11. The apparatus according to claim 9, wherein the instruction further causes the image processing apparatus to perform weighted addition for each of the at least some pixels using a weight according to a size of each of the adjacent areas overlapping the scope.

12. The apparatus according to claim 9, wherein the instruction further causes, when executed by the at least one processor, the image processing apparatus to perform weighted addition for each of the at least some pixels using a weight according to a difference between the brightness value of the pixel and average brightness values of the respective adjacent areas overlapping the scope.

13. A control method of an image processing apparatus, the method comprising:
dividing a first image into a plurality of areas based on obtained image data of the first image corresponding to a first brightness, and setting, for each of the plurality of areas, relationship information that associates an input brightness value with an output brightness value;
specifying at least some pixels of the first image, wherein the at least some pixels belong to adjacent areas of the plurality of areas respectively;
converting, based on the relationship information, a brightness value of a pixel included in the first image into a brightness value of a pixel of a second image which corresponds to a brightness range narrower than a brightness range to which the first image corresponds by determining a brightness value, for each of the at least some pixels, in the second image such that (a) a brightness value for one pixel of the at least some pixels is determined based on the relationship information set for respective areas to which each of the at least some pixels belongs and (b) a brightness value for another pixel of the at least some pixels is determined based on the relationship information set for the respective areas.

14. The method according to claim 13, wherein in the specifying, the at least some pixels of the first image is specified based on information of an environment that includes information on a resolution of the second image.

15. The method according to claim 13, wherein in the specifying, the at least some pixels of the first image is specified based on information of an environment that includes information on an observation distance when observing the second image.

16. The method according to claim 13, wherein in the specifying, the at least some pixels of the first image is specified based on the information of an environment that includes a frequency of the first image.

17. The method according to claim 13, wherein the relationship information is set for each of the plurality of areas such that respective output brightness values associated with a predetermined input brightness value in the relationship information for each of the plurality of areas are different from each other.

18. The method according to claim 13, wherein the relationship information is set for each of the plurality of areas based on distribution of the brightness values of pixels in the respective areas.

19. The method according to claim 13, wherein in the converting:
an average brightness value of the brightness values for each of the plurality of areas is specified; and
weighted addition of the average brightness values for the adjacent areas in the plurality of areas is performed for each of the at least some pixels, thereby calculating the brightness value of the pixel in the second image.

20. The method according to claim 14, wherein the information of the environment further includes a brightness of the second image.

21. The method according to claim 13, wherein a scope including parts of the respective adjacent areas is set and, in the specifying, pixels included in the scope and the parts of the respective adjacent areas are specified as the at least some pixels.

22. The method according to claim 21, wherein a size of the scope is determined based on an information of an environment when the second image is observed.

23. The method according to claim 21, wherein weighted addition is performed for each of the at least some pixels using a weight according to a size of each of the adjacent areas overlapping the scope.

24. The method according to claim 21, wherein weighted addition is performed for each of the at least some pixels using a weight according to a difference between the brightness value of the pixel and average brightness values of the respective adjacent areas overlapping the scope.

25. A non-transitory computer-readable storage medium that stores a computer program configured to cause a computer provided in an image processing apparatus to:

divide a first image into a plurality of areas based on obtained image data of the first image corresponding to a first brightness, and set, for each of the plurality of areas, relationship information that associates an input brightness value with an output brightness value;

specify at least some pixels of the first image, wherein the at least some pixels belong to adjacent areas of the plurality of areas respectively;

convert, based on the relationship information, a brightness value of a pixel included in the first image into a brightness value of a pixel of a second image which corresponds to a brightness range narrower than a brightness range to which the first image corresponds by determining a brightness value, for each of the at least some pixels, in the second image such that (a) a brightness value for one pixel of the at least some pixels is determined based on the relationship information set for respective areas to which each of the at least some pixels belongs and (b) a brightness value for another pixel of the at least some pixels is determined based on the relationship information set for the respective areas.

* * * * *